US 8,424,058 B2

(12) United States Patent
Vinogradov et al.

(10) Patent No.: US 8,424,058 B2
(45) Date of Patent: Apr. 16, 2013

(54) SECURITY PROXYING FOR END-USER APPLICATIONS

(75) Inventors: Ilja Vinogradov, Reading (GB); Eric R. B. Wood, Menlo Park, CA (US)

(73) Assignee: SAP AG, Walldorf (DE)

( * ) Notice: Subject to any disclaimer, the term of this patent is extended or adjusted under 35 U.S.C. 154(b) by 1068 days.

(21) Appl. No.: 11/867,650

(22) Filed: Oct. 4, 2007

(65) Prior Publication Data
US 2008/0141341 A1 Jun. 12, 2008

Related U.S. Application Data (60) Provisional application No. 60/873,869, filed on Dec. 7, 2006.

(51) Int. Cl.
G06F 7/00 (2006.01)
(52) U.S. Cl.
USPC ............................ 726/3; 717/100; 705/50
(58) Field of Classification Search ........... 717/100; 705/50; 726/3
See application file for complete search history.

(56) References Cited

U.S. PATENT DOCUMENTS

| | | | |
|---|---|---|---|
| 5,848,424 A | 12/1998 | Scheinkman et al. | |
| 6,441,834 B1 | 8/2002 | Agassi et al. | |
| 6,462,757 B1 | 10/2002 | Kao et al. | |
| 6,480,842 B1 | 11/2002 | Agassi et al. | |
| 6,502,094 B1 | 12/2002 | Gvily et al. | |
| 6,640,238 B1 | 10/2003 | Bowman-Amuah | |
| 6,775,674 B1 | 8/2004 | Agassi et al. | |
| 6,904,463 B1 * | 6/2005 | Fadel | 709/236 |
| 7,085,994 B2 | 8/2006 | Gvily | |
| 7,146,505 B1 * | 12/2006 | Harada et al. | 713/185 |
| 7,546,543 B2 | 6/2009 | Louch et al. | |
| 7,555,538 B2 | 6/2009 | Shenfield et al. | |
| 7,761,800 B2 | 7/2010 | Chaudhri et al. | |
| 7,793,342 B1 * | 9/2010 | Ebrahimi et al. | 726/8 |
| 7,844,835 B2 | 11/2010 | Ginter et al. | |
| 2001/0043235 A1 * | 11/2001 | Best et al. | 345/781 |

(Continued)

FOREIGN PATENT DOCUMENTS

JP 2006-114038 4/2006

OTHER PUBLICATIONS

Editors: van Kesteren et al.: Widgets 1.0 W3C Working Draft Nov. 9, 2006, Retrieved from the World Wide Web on Jan. 30, 2007 http://www.w3.org/TR/2006/WD-widgets-20061109/.

(Continued)

*Primary Examiner* — Kambiz Zand
*Assistant Examiner* — Sayed Beheshti Shirazi
(74) *Attorney, Agent, or Firm* — Blakely, Sokoloff, Taylor & Zafman LLP (57) ABSTRACT

Methods and apparatuses enable a service mediator to provide security proxying services to an end-user application requesting a backend service of an enterprise network. The end-user application generates a request for a service of the backend system. The request does not have sufficient security information to enable access to the backend system. The service mediator can detect that one or more items of required security information are not present in the request and injects the necessary security information into the request. The end-user application need not even have access to the security information or even be aware that security information is needed to access the service. The request having the required security information is sent to the backend to enable access to the backend service.

23 Claims, 4 Drawing Sheets

U.S. PATENT DOCUMENTS

| | | | |
|---|---|---|---|
| 2002/0046170 A1 | 4/2002 | Gvily | |
| 2002/0065955 A1 | 5/2002 | Gvily | |
| 2002/0078201 A1 | 6/2002 | Gvily | |
| 2002/0091757 A1* | 7/2002 | Cuomo et al. | 709/203 |
| 2004/0056896 A1 | 3/2004 | Doblmayr et al. | |
| 2004/0181469 A1* | 9/2004 | Saeki | 705/30 |
| 2004/0250118 A1* | 12/2004 | Andreev et al. | 713/201 |
| 2005/0097089 A1 | 5/2005 | Nielsen et al. | |
| 2005/0154886 A1* | 7/2005 | Birk et al. | 713/168 |
| 2006/0031442 A1* | 2/2006 | Ashley et al. | 709/223 |
| 2006/0070007 A1 | 3/2006 | Cummins et al. | |
| 2006/0107231 A1* | 5/2006 | Matthews et al. | 715/788 |
| 2006/0264202 A1* | 11/2006 | Hagmeier et al. | 455/411 |
| 2007/0038934 A1 | 2/2007 | Fellman | |
| 2007/0101297 A1* | 5/2007 | Forstall et al. | 715/841 |
| 2007/0239911 A1* | 10/2007 | Finnerty et al. | 710/65 |
| 2008/0005789 A1* | 1/2008 | Kigo et al. | 726/5 |
| 2008/0009344 A1 | 1/2008 | Graham et al. | |
| 2008/0141341 A1* | 6/2008 | Vinogradov et al. | 726/2 |
| 2008/0195483 A1 | 8/2008 | Moore | |
| 2009/0024944 A1 | 1/2009 | Louch et al. | |
| 2009/0031284 A1 | 1/2009 | Shenfield et al. | |
| 2009/0055843 A1 | 2/2009 | Engber et al. | |
| 2009/0158180 A1 | 6/2009 | Magnani et al. | |

OTHER PUBLICATIONS

Wikipedia, Widget Engine Retrieved from the World Wide Web on Jan. 30, 2007 http://en.wikipedia.org/wiki/Widget_engine.

Wikipedia, Widget (computing) Retrieved from the World Wide Web on Jan. 23, 2007 http://en.wikipedia.org/wiki/Widget_%28computing%29#Desktop_.

Wikipedia, Widget engine Retrieved from the World Wide Web on Jan. 23, 2007 http://en.wikipedia.org/wiki/Widget_engine.

Wikipedia, Google Desktop Retrieved from the World Wide Web on Jan. 23, 2007 http://en.wikipedia.org/wiki/Google_Desktop.

Wikipedia, Yahoo! Widget Engine Retrieved from the World Wide Web on Jan. 23, 2007 http://en.wikipedia.org/wiki/Konfabulator.

Non-Final Office Action for U.S. Appl. No. 11/867,655 Mailed Jul. 6, 2010, 14 Pages.

Non-Final Office Action for U.S. Appl. No. 11/867,648, Mailed Aug. 30, 2010, 21 pages.

Final Office Action for U.S. Appl. No. 11/867,655, Mailed Sep. 13, 2010, 12 pages.

Non-Final Office Action for U.S. Appl. No. 11/867,653, Mailed Sep. 15, 2010, 26 pages.

Final Office Action from U.S. Appl. No. 11/867,653 mailed Mar. 1, 2011, 26 pages.

Non-Final Office Action for U.S. Appl. No. 11/867,655, Mailed Mar. 15, 2011, 12 pages.

Non-Final Office Action for U.S. Appl. No. 11/807,648, 26 Pages, Mailed Oct. 25, 2011.

Final Office Action for U.S. Appl. No. 11/867,653, Mailed Apr. 1, 2011, 26 pages.

Final Office Action from U.S. Appl. No. 11/867,648 mailed Mar. 1, 2011, 21 pages.

Final Office Action from U.S. Appl. No. 11/867,648 mailed May 22, 2012, 22 pages.

* cited by examiner

SECURITY PROXYING FOR END-USER APPLICATIONS

RELATED APPLICATION

This U.S. patent application claims the benefit of priority of U.S. Provisional Application 60/873,869 filed Dec. 7, 2006.

FIELD

Embodiments of the invention relate to computer security, and more particularly to systems and methods for providing security information for an end-user application via proxy to a secured system to be accessed.

BACKGROUND

An enterprise or an organization with a backend system typically has security measures in place that limit or restrict access to the backend system. Such a secured backend system is generally available only with proper authentication information or other security credentials. Traditional access to the enterprise backend required the accessing application to provide security credentials, and access was granted upon verification of the credentials. Note that a similar system is in place with other network systems that have a secured portion. For example, some websites or certain content on the Internet is only accessible with proper authentication. In order to access such content, the web browser provides proper security credentials that allow access to the content.

Any of a number of applications may be used to access an enterprise backend. Because each application has access to security information, each application may introduce a point of security risk. Generally, an application has access to an authentication library and/or has code directly in the program code that provides authentication services for the application. Because each application traditionally has access to security information, each application could directly obtain security information that could pose a security risk. For each application, certain security information is traditionally included in the application, resulting in development effort being invested in each application to implement security. Because of the fact that authentication services are often provided via library, a generic implementation is generally made in each application.

In addition to traditional, feature-rich applications that execute on a desktop, there exists a class of applications that is designed to be narrowly defined in scope of functionality and having a dedicated purpose. Such applications are generally referred to as "widgets" or "gadgets." Traditionally, widgets are considered to be more portable from one platform to another. The functionality of widgets is traditionally limited to games (e.g., tic-tac-toe, sudoku) or novelty features (e.g., cursor followers), and more recently to functional features available over an unsecured Internet connection (e.g., weather indicator, mortgage rate indicator, etc.). Traditionally, widgets have no capability of connecting with an enterprise backend or other secured network connection. Thus, widgets have not traditionally been a significant security concern because of their limited functionality, and lack of connectivity within the enterprise.

SUMMARY

An input is received that solicits an operation of an end-user application. In one embodiment, the end-user application is a desktop widget. In one embodiment, the widget is an enterprise widget that has self-contained access to a backend enterprise system. In response to receiving the input, the end-user application sends a request for service of a backend server that provides the operation to a security proxy. In one embodiment, the security proxy includes functions other than security proxying. The request from the end-user application lacks at least one item of information required to access the backend server. The request causes the security proxy to inject authentication information into the request to supply the missing item(s), and forward the request to the backend with the proper authentication information. The end-user application receives a response from the backend server including data related to the solicited operation, which it can then represent in an interface.

In one implementation, a service mediator provides services to an end-user application. In one embodiment, the end-user application is a desktop widget. In one embodiment, the widget is an enterprise widget that has self-contained access to a backend enterprise system. The service mediator receives a request from the end-user application requesting a service of a backend server. The service mediator can evaluate whether the request includes sufficient security information for the end-user application to access the backend. If the request does not include sufficient security information, the service mediator injects required security information into the request and forwards the request to the backend with sufficient security information.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Methods and apparatuses enable security proxying for applications. Additionally, methods and apparatuses enable business widgets or enterprise widgets that are capable of connecting to an enterprise backend system. Enterprise widgets or other end-user applications can send a request for backend services to a security proxy that injects authentication information and/or other security credentials into the request and sends the request to the backend for the requested services. In one embodiment, the end-user application does not even need to know that security information is needed to access the backend services. The end-user application does not directly obtain the security information. In one embodiment, an end-user application is configured to use security proxying for its security, and has no self-contained security solution. Thus, even with portable applications, such as an enterprise widget, additional security risks are not introduced into the system. The end-user application leverages an available security solution on the system via the security proxy. The available security solution thus becomes a security solution for the end-user application, as described herein, and security risks associated with the end-user application are reduced.

Security proxying as described herein can be applied to any type of end-user application, and may find particular use in providing security for widgets. One particular type of widget that may use security proxying is an enterprise widget. As used herein, an enterprise widget refers to a class of applications characterized by focused functionality and features, minimized form factor (relative to feature-rich applications), and reduced resource consumption (relative to feature-rich applications), which is capable of connecting to a backend system. Although specifically described with respect to enterprise widgets, the security proxying concepts are not limited to application in an enterprise widget, but can be used in any widget that needs secure access to a remote server, or any application that needs remote access to a remote server.

The principle functionality and/or features of the enterprise widget are provided via a backend service. In one embodiment, an enterprise widget can be understood as being an interactive desktop tool, where a user would generally associate the user interface with the functionality of the enterprise widget. An enterprise widget may also be referred to as an enterprise gadget, a business widget, or a portable logic module (PLM). Widget as used herein should be distinguished from the use of the term "widget" to refer to GUI components such as sliders, buttons, checkboxes, and dropdowns. The World Wide Consortium ("W3C") define widgets as "usually small client-side applications for displaying and updating remote data, packaged in a way to allow a single download and installation on a client machine . . . " Refer to W3C, Widgets 1.0 (W3C Working Draft 9, November 2006). The W3C definition appropriately defines the class of applications referred to herein as widgets. An enterprise widget more specifically includes functionality that enables communication with backend servers within an enterprise environment. Enterprise widget is to be understood broadly to incorporate any diminutive application having backend access. For purposes of simplicity in description, the expression "enterprise widget" will be used, although it will be understood that any of the other terms could be substituted.

Examples of enterprise widgets and their use may include the following. Consider an employee of a company that has a number of enterprise widgets on a desktop, each having access to a specific subset of enterprise data hosted on backend enterprise systems (e.g., databases, servers). The employee may initiate an enterprise widget named "Single Part Inventory Lookup," which has the functionality to access secured enterprise backend data related to inventory levels of a given part. The enterprise widget may accept a part number or description as a parameter, and return a value representing available inventory.

If the employee is authorized to access such information, the enterprise widget can successfully access such data. The employee need not know specific security protocols. The enterprise widget can gain access to the data via a security proxy that obtains security credentials from a security solution on the user's operating environment (e.g., a single sign-on (SSO) solution) on behalf of the enterprise widget. The security for the particular transaction can be transparent to the user, because the user has already "signed in," and the credentials can be leveraged for the applications that are executed under the environment in which the user signed on (e.g., all applications run under an operating system of a user device).

In one embodiment, the enterprise widget contains all business logic necessary to interface with the user and send a request to the enterprise. Alternatively, business logic can be contained within a runtime environment on which the enterprise widget executes. In one embodiment, the security proxy engine is included within the widget runtime engine. The security proxy includes business logic necessary to obtain the security information and inject such security information into the request generated in the enterprise widget.

As discussed herein, a security proxy refers to a program, runtime environment, or security engine that provides security services to an end-user application. In one embodiment, the security proxy is part of a services mediator that acts as a service intermediary for one or more end-user applications. The services mediator includes one or more interfaces that provide connections to end-user applications, and one or more interfaces that interface with a service (e.g., components of a service-oriented architecture (SOA)). Additionally, the security proxy may include one or more interfaces that interface with a security solution on an operating environment in which the services mediator/security proxy and the end-user applications operate. Such interfaces and example architecture or system structure are described in more detail below with reference to the drawings.

Figure 1:
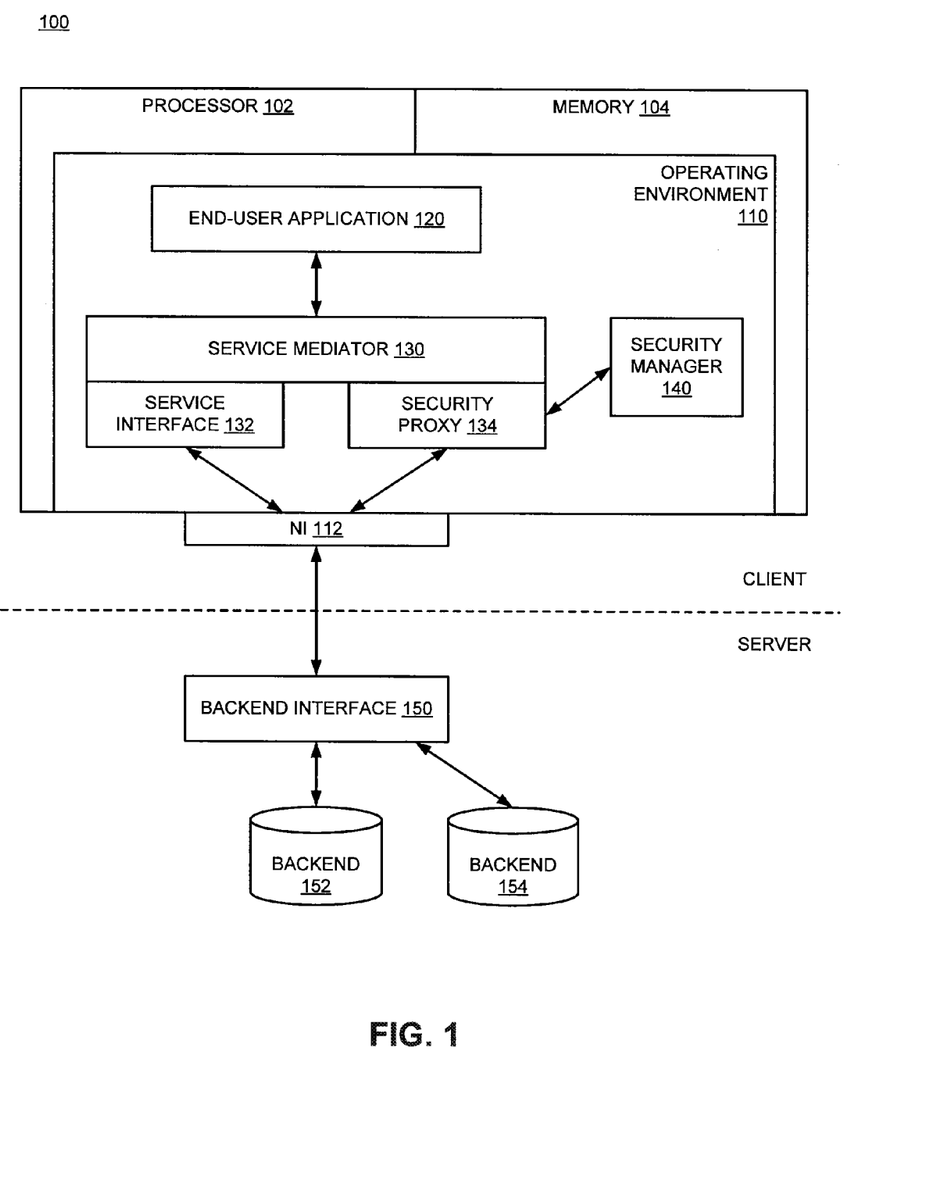
FIG. 1 is a block diagram of an embodiment of a system having an end-user application that interfaces with a secure backend via a service mediator.

FIG. 1 is a block diagram of an embodiment of a system having an end-user application that interfaces with a secure backend via a service mediator. System 100 represents an enterprise system, referring to any business, organization, corporation, etc. System 100 includes a client side and a server side, which are illustrated separated by the dashed line. The client side may include a client device that includes processor 102 and memory 104. Processor 102 refers to any type of processor (e.g., central processing unit (CPU), microprocessor, etc.) whether single or multi-core. Memory 104 refers to any type of storage medium (e.g., any type of random access memory (RAM), Flash, etc.) that holds data and/or code for execution by processor 102. Memory 104 is generally volatile (e.g., its state is lost at an interruption of power to the storage device), although such is not a requirement.

Memory 104 holds instructions for execution by processor 102, among which may be instructions to execute components illustrated in FIG. 1. Alternatively, such components may represent functionality provided by hardware that operates in conjunction with an environment provided by processor 102 and memory 104. Operating environment 110 represents a hardware and/or software state in which operations can be performed by hardware and/or software components that provide security proxying of requests from an end-user application. Operating environment 110 generally includes an operating system.

End-user application 120 represents a software application that has interfaces with which to interact with a user. Such interfaces include graphical displays, in which representations of data are provided by end-user application 120. End-user application 120 may be a widget or other application. Specifically regarding security proxying, end-user application 120 represents an application that requests data/services from a remote server. As used herein, "remote" refers to a server that is separate in software environment and/or hardware. Remote is not to be constrained to interpretations of geographical proximity. Specifically illustrated is the server side of system 100. The server side may be, for example, an enterprise backend.

Service mediator 130 also operates on operating environment 110. Service mediator 130 provides services to end-user application 120. End-user application 120 and service mediator 130 can be considered to be coupled together. Coupling together may refer to any type of connection or interfacing, including the use of application programming interfaces (APIs), function calls, etc. In one embodiment, service mediator 130 includes multiple APIs that are accessible to end-user application 120 for requesting and receiving a particular service. For purposes of the discussion herein, the services can be generally understood as remote services, which require a security authorization for access. Thus, end-user application 120 must provide security credentials to access the services provided.

Service mediator 130 includes one or more service interfaces 132 that enable access to one or more services provided by the server side. Service mediator 130 also includes security proxy 134, which injects security information into requests for services accessed via service interface 132. In one embodiment, security proxy 134 obtains security information, which is then provided into requests prior to the requests being sent via service interface 132. Thus, in one embodiment, the arrow in the drawing representing a connection from security proxy 134 to network interface (NI) 112 may not exist. Alternatively, a request from service interface 132 could be responded to with a request for security information. Such information could then be provided by security proxy 134. Thus, "injecting security information" can be understood to include either or both of providing security information prior to sending a request to the backend, or providing security information in response to a request for security information or an indication that insufficient security information is provided.

Security proxy 134 accesses security information from security manager 140, which may be any type of security information source. Security information may be stored in a storage device, which may be a secure storage device. Security manager 140 may be an SSO solution that operates on operating environment 110 to provide security management for the environment. Security manager 140 and security proxy 134 may be coupled via APIs or other interfaces.

NI 112 represents hardware and/or software components that provide network access to the client. For example, NI 112 may include connectors, a network interface card with processors and logic components, as well as drivers and interface components. NI 112 couples the client to the network(s) accessible by end-user application 120 that makes a request for services. The server is coupled to the client over one or more networks accessible to the client by NI 112.

The server may include backend interface 150, which represents network interface(s), network management entities, security policy enforcement entities, etc. The server side includes one or more backend components 152 and 154. Backend components 152 and 154 may be enterprise databases or enterprise servers from which data and services are accessed by the client. Security credentials may be required to access one or more services from the backend components. The required security information is not necessarily the same for all backend components, nor is it necessarily the same for all services available from a backend component. Thus, the security information injected by security proxy 134 does not necessarily enable the client to access all data and services available from the backend or from any particular component of the backend. The security information injected enables the client to access all services to which the user is authorized, without requiring the user to provide the information each time a service or a server is to be accessed. Such security proxying can thus enable practical componentizing of the backend services on the user's desktop through the use of enterprise widgets.

Figure 2:
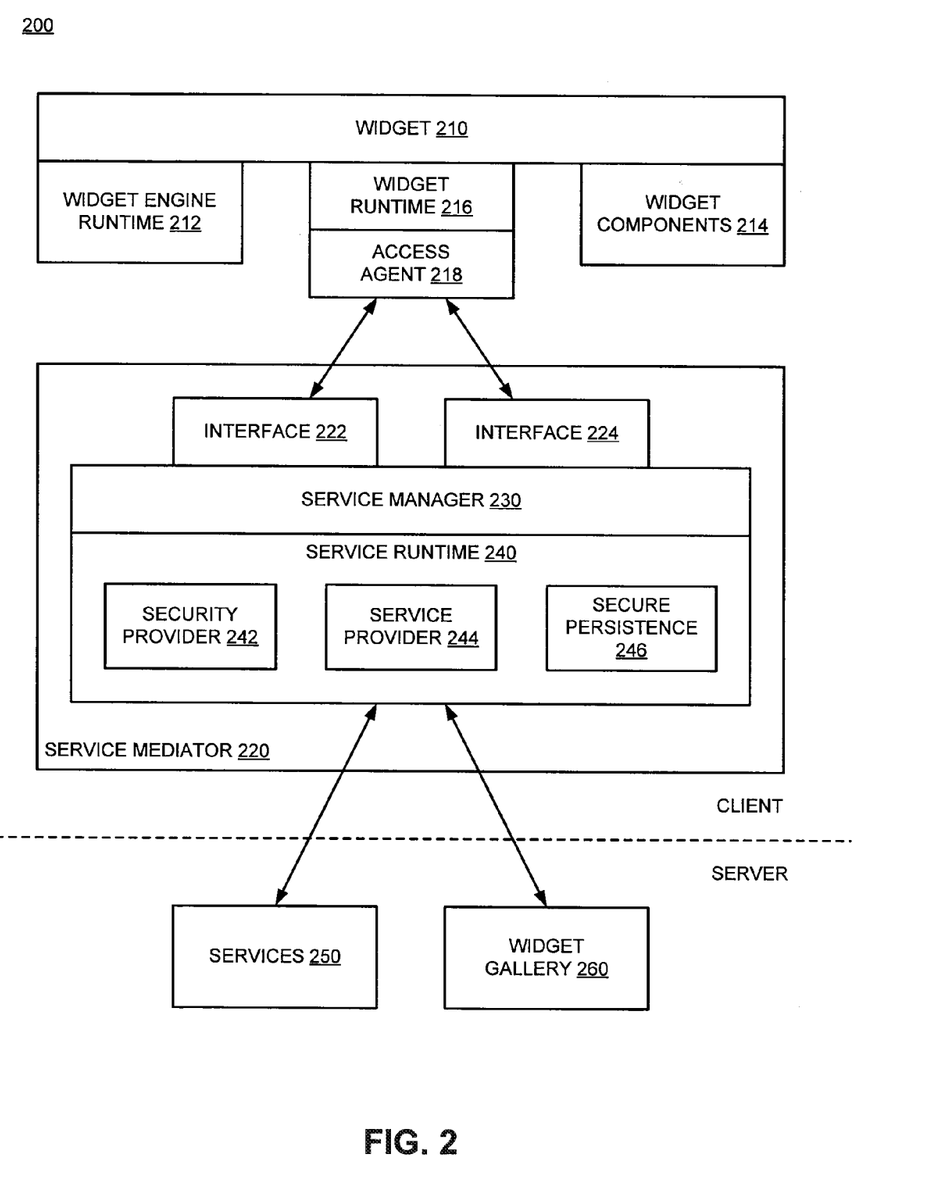
FIG. 2 is a block diagram of an embodiment of a system having widget that accesses a backend via a service mediator.

FIG. 2 is a block diagram of an embodiment of a system having widget that accesses a backend via a service mediator. System 200 provides a representation of a client with a widget environment and a service mediator. Widget 210 represents any type of widget as described above, including a gadget or an enterprise widget. Widget 210 is any type of end-user application that has a specific functionality for a specific service, where a user would generally consider the graphical representation and the specific functionality or service to be one and the same. An example may be a "Part Lookup" widget, where a user would generally recognize the widget by the functionality it provides.

Widget 210 is enabled by widget engine runtime 212 and widget components 214. Widget engine runtime 212 represents an abstraction of logic used to enable the widget. Widget engine runtime 212 can be provided for each widget started. Widget engine runtime 212 illustrates that widgets are portable and can be taken from one environment to another. Widget components 214 include reusable user interface and business components, and may include graphical components (e.g., skins) for generating a widget representation.

Widget runtime 216 represents the combination of business logic, and widget components that provide functionality for widget 210. Widget 210 can be understood as the representation of the widget functionality, and provides interaction with a user. Widget 210 also includes access agent 218, which enables widget 210 to access services related to its functionality. Access agent 218 represents one or more mechanisms through which widget 210 communicates. In one embodiment, access agent 218 represents one or more components of an AJAX service bus (ASB), which has a bus controller that provides communication features such as security, reliability, guaranteed delivery, and asynchronous push. Access agent 218 may be an agent or a component that can communicate with multiple different interfaces types, or may be a bus that interfaces to multiple interface types.

Widget 210 communicates to the backend through access agent 218 to service mediator 220. In one embodiment, service mediator 220 is a mash-up of service interfaces. In one embodiment, each interface can be represented as an object, and service mediator 220 is a container that includes the objects. Service mediator 220 is illustrated with interfaces 222 and 224, which couple service mediator 220 with widget 210. The interfaces may be different types of interfaces for communication or service interaction. Interface examples include JSON (JavaScript Object Notation) and XML (extensible markup language), which are interchange formats that can be used to exchange data messages. Other interface types could be used.

Service mediator 220 includes service manager 230, which represents logic to manage the various services available via service mediator 220. Managing the services may include functions such as identifying the services, exposing the services to end-user applications, directing a request to the appropriate service, etc. In one embodiment, managing the service includes determining that a request has insufficient security information to access the service, and triggering the operation of a security inserting module (e.g., security provider 242 as shown).

Service mediator 220 includes service runtime 240, which represents the logic or functionality that enables various services to be accessed via the service mediator. Service runtime 240 may include methods or call routines or interfaces that can trigger a service request to a backend. Note that each service may have different requirements for requesting the service. Each of the different requirements can be met with different methods or routines, each of which can be part of service runtime 240. In one embodiment, service runtime 240 can be considered the grouping of service modules or service APIs.

Examples of functional elements of service runtime 240 include security provider 242, which enables service mediator 220 to inject or provide necessary security information or security credentials into a request. The security information can be considered to "complete" a request by providing necessary information that is missing from a request generated from widget 210. Service runtime 240 include service provider 244, which represents one or more modules, or logic to access one or more services of the server. In one embodiment, service runtime 240 includes secure persistence 246, which represents a secure cache in which security information may be stored in service mediator 220. For example, security provider 242 may access an SSO client and locally store security information related to a particular user for use with multiple end-user applications.

Service mediator 220 accesses the backend server, which may include services 250 and widget gallery 260. Services 250 provide the actual service functionality and data related to services requested by the client, and accessed via service mediator 220. Widget gallery 260 may provide widget components that can be uploaded into the widget runtime. Widget gallery 260 could be loaded with updates to widgets, which can then be downloaded or pushed back to the client.

Figure 3:
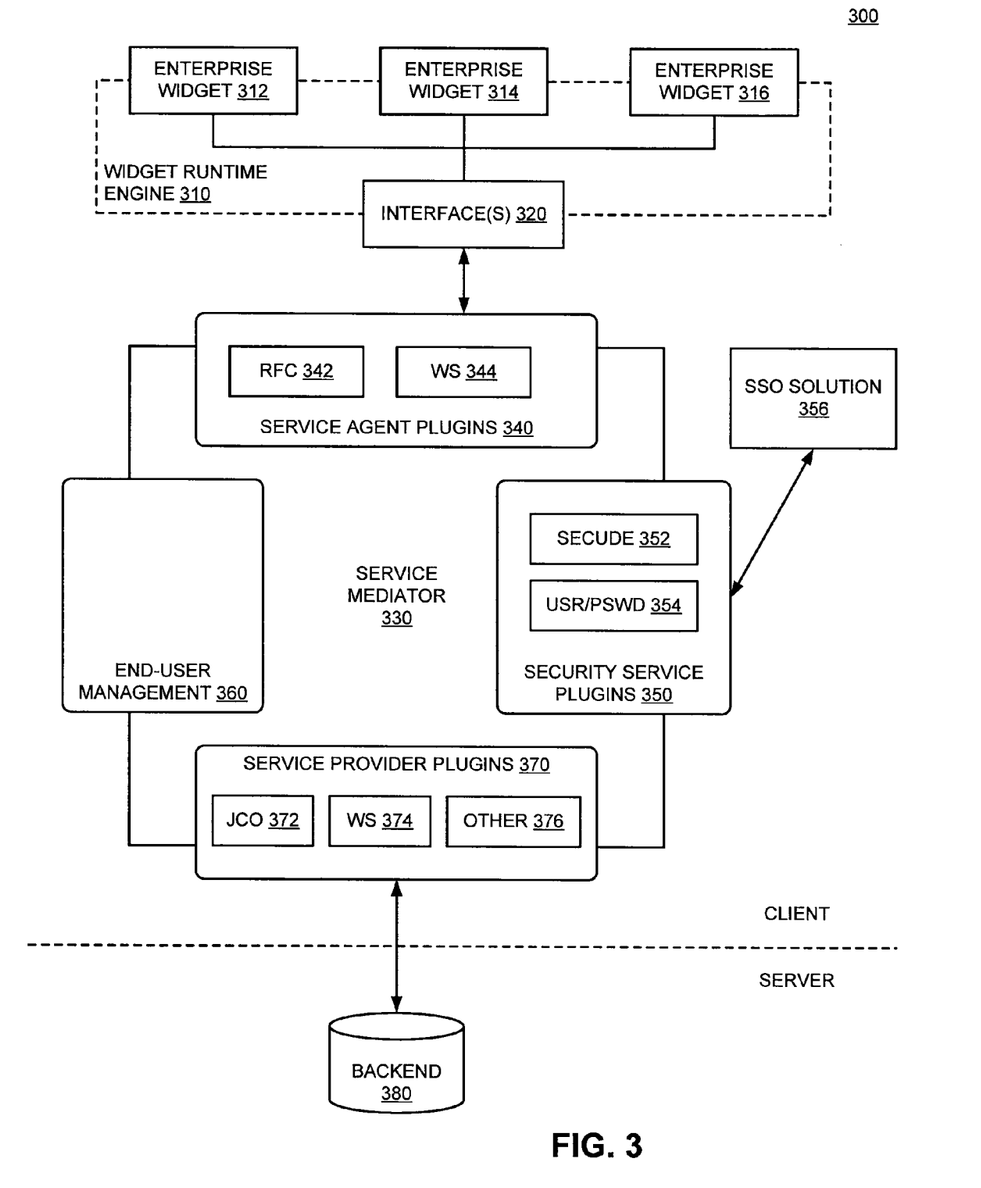
FIG. 3 is a block diagram of an embodiment of a system with enterprise widgets that access a backend via a service mediator with security information injected by the service mediator.

Various components described herein in FIGS. 1, 2, and 3 may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

FIG. 3 is a block diagram of an embodiment of a system with enterprise widgets that access a backend via a service mediator with security information injected by the service mediator. System 300 includes a client side and a server side. In the representation of system 300, the client is illustrated with multiple enterprise widgets, 312-316. The widgets can be considered to run "on top" of widget runtime engine 320, as depicted in the drawing. Enterprise widgets 312-316 can be widgets according to the model described in FIG. 2. Widget runtime engine 310 can be a runtime according to that described in FIG. 2. Thus, widget engine runtime 310 provides logic and functionality to enable enterprise widgets 312-316. The enterprise widgets request backend services via one or more interfaces 320, as described above with respect to FIG. 2.

As illustrated, in one embodiment, service mediator 330 can be understood as a mash-up of service plugins. As used herein, a plugin refers to a software program that operates on top of, or dependently with, another program. Plugins may also be referred to as addons. Plugins utilize APIs or similar mechanisms for control and interfacing, may have a specific associated protocol, and may register with the host program and/or with an operating system on which the host program operates. The plugins may be control modules that are executed on service mediator 330, where service mediator 330 provides user interface and graphical components, and the plugins provide functionality. For example, to communicate with the enterprise widgets, service mediator 330 may include multiple service agent plugins 340. Each plugin provides functionality to enable access to service mediator 330 via a different mechanism. To provide functional support for additional interfaces, additional plugins may be added. Example service agent plugins may include one or more remote function call (RFC) plugins 342 and/or web service (WS) plugins 344.

Service mediator 330 also includes end-user management 360, which can enable access to service mediator 330 from a user interface, for example, to set configurations, establish which plugins are available, etc. End-user management 360 may include, for example, graphical components and a rendering engine to generate a display with which a user may interface. End-user management 360 also includes the logic and functionality to enable the user to add or remove plugins, or perform other management operations.

Service mediator 330 as described herein includes security service plugins 350. Security service plugins 350 can include, for example, SECUDE plugin 352 or other SSO mechanism, and/or username and password (usr/pswd) mechanism 354. SECUDE is an SSO solution available from SECUDE International AG of Lucerne, Switzerland. All trademarks are used herein solely for purposes of identification, and each trademark is the property of its respective owner. Security plugins from other provides can be used, and security information solutions other than the SECUDE or a username password combination can be employed.

Service mediator 330 includes service provider plugins 370, which represent the various types of services or service provider types that may be available through service mediator 330. Examples of service provider plugins may include JCO (Java connector) 372, WS (web service) 374, or other plugin 376. JCO 372 can provide interfacing to a database or other backend data services. WS 374 provides interfacing to a service available on an enterprise network. Other plugins 376 may include JCA (Java 2 Connector Architecture), JMS (Java Message Service), etc. The service provider plugins provide the link to the enterprise backend 380, which may include one or more devices or data sources.

Figure 4:
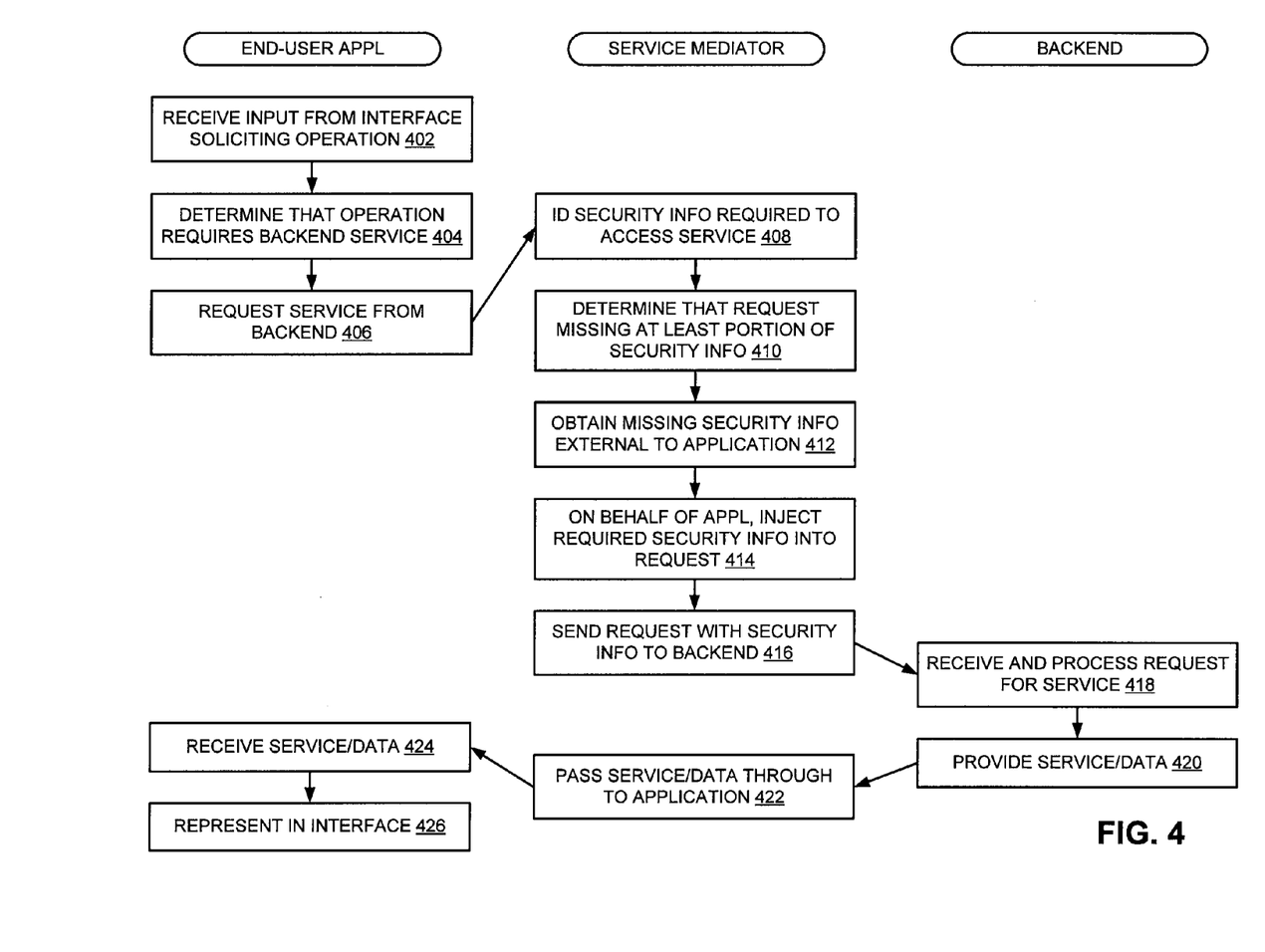
FIG. 4 is a flow diagram of an embodiment of a process for accessing a backend with an end-user application.

FIG. 4 is a flow diagram of an embodiment of a process for accessing a backend with an end-user application. A flow diagram as illustrated herein provides examples of sequences of various process actions. Although shown in a particular sequence or order, unless otherwise specified, the order of the actions can be modified. Thus, the illustrated implementation should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

The flow of FIG. 4 illustrates certain operations performed by an end-user application, a service mediator, and a backend, and certain interactions between them. An end-user application (e.g., a widget) receives an input via an interface (e.g., a graphical user interface (GUI)) soliciting an operation, 402. The end-user application determines that the operation requires a backend service, 404. For example, the end-user application could be an SAP (referring to SAP AG of Walldorf, Germany) enterprise search (ARGO) widget. The widget can provide a simple interface from which a user can input a search and receive results of a search of a backend system for the query. The end-user application requests the service from the backend, 406. The request is generated through a request interface, which couples the end-user application to a service mediator.

Thus, the request is received by a service mediator. In one embodiment, the service mediator identifies security information that is required to access the service, 408. The service mediator may identify such security information from information stored locally to the service mediator about each service (e.g., a metadata description). Alternatively, the service mediator can generate the request and receive a request for authentication information from the service provider. In response to identifying the required security information, the service mediator determines that the request is missing at least a portion of the required security information, 410. The portion could be part of the required information (e.g., a password for a known user), or the entire security information (e.g., a user name and password, a digital certificate, a passcode, etc.).

The service mediator obtains the missing security information from a source external to the requesting end-user application, 412. That is, the end-user application need only request the service, and the service mediator can obtain the service (assuming security authorization exists in the system) without requiring additional input from the end-user application. Such operation can enable the end-user application to not have, or even be aware of, security information. Continuing the example above, a search widget may receive a query for a secure database that requires a password to access. The user is assumed logged in on the system (otherwise the user could not generate the request via the widget), and the security information can be obtained from within the system. The widget need not have access to the security information, or even be configured or programmed to be aware of security information Thus, portable end-user programs could be developed that are movable from machine to machine that provide enterprise functionality without introducing a security risk. That is, if the enterprise widget (a portable program) were "stolen" from a user's desktop, no security information would be lost if the enterprise widget did not have security information. Similarly, there would be no risk of comprise if the enterprise widget did not have direct access to security information. However, the (non-portable) service mediator can provide the security information and enable secure functionality of the enterprise widget.

Thus, on behalf of the end-user application, the service mediator injects the required security information into the request, 414, and sends the request with the security information to the backend, 416. Sending the request may include invoking a service provider plugin, which functions to access the backend. The backend receives and processes the request for the service, 418. The request will have the security information as provided by the service mediator, and can provide a service and/or associated data or data related to the service in response to the request, 420.

The backend provides the data/service to the service mediator via the service provider interface of the service mediator, which can pass the data/service through to the end-user application, 422. The end-user application receives the service/data in response to the request, 424. Note that the entire process surrounding security can be transparent to the end-user application. Hence the use of the expression "security proxying," because the service mediator proxies the security information without the need for input from the end-user application, after the initial request. The end-user application can then represent data related to the requested service in an interface (e.g., the one from which the input was received), 426.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. In an end-user application, a method comprising:
receiving input from an interface, the input soliciting an operation of the end-user application, wherein the end-user application is one of multiple enterprise widgets, limited featured applications that execute on a widget runtime environment on a computing platform of an enterprise, the enterprise widgets available to a user authenticated on the computing platform, the widget runtime environment to execute on the computing platform to provide an execution platform on the computing platform including services shared by the enterprise widgets, each enterprise widget including functionality to access enterprise data from one or more backend servers of the enterprise;
sending, from the end-user application to the widget runtime environment, a request for a service of a backend server that provides the solicited operation, the request having insufficient security information for the backend server to authenticate the application to enable the application to access the requested service, the request to cause the widget runtime environment to use a security proxy on the widget runtime environment to determine that the request from the end-user application is missing required security information for the request, obtain the required security information not included in the request from a security information source separate from the end-user application, and to inject the security information into the request for the service of the backend server in response to determining that the request does not include the required security information and forward the request to the backend server;

receiving the service from the backend server at the end-user application in response to the solicited operation, based on the backend server authenticating the end-user application with the security information injected by the security proxy; and providing a representation of data associated with the received service in the interface.

2. The method of claim 1, wherein the end-user application comprises a desktop widget.

3. The method of claim 1, wherein the end-user application has no self-contained access to the security information.

4. The method of claim 1, wherein the end-user application is unaware of a need for security information to be included in the request to the backend server.

5. The method of claim 1, wherein the security proxy comprises a service mediator that provides services to the end-user application, including a security proxy service.

6. An article of manufacture comprising a non-signal machine readable storage medium having content stored thereon to provide instructions that cause a machine to perform operations including:

receiving input from an interface, the input soliciting an operation of the end-user application, wherein the end-user application is one of multiple enterprise widgets, limited featured applications that execute on a widget runtime environment on a computing platform of an enterprise, the enterprise widgets available to a user authenticated on the computing platform, the widget runtime environment to execute on the computing platform to provide an execution platform on the computing platform including services shared by the enterprise widgets, each enterprise widget including functionality to access enterprise data from one or more backend servers of the enterprise;

sending, from the end-user application to the widget runtime environment, a request for a service of a backend server that provides the solicited operation, the request having insufficient security information to access the requested service, the request to cause the widget runtime environment to use a security proxy on the widget runtime environment to determine that the request from the end-user application is missing required security information for the request, obtain the required security information not included in the request from a security information source separate from the end-user application, and to inject the security information into the request for the service of the backend server in response to determining that the request does not include the required security information and forward the request to the backend server;

receiving the service from the backend server at the end-user application in response to the solicited operation, based on the backend server authenticating the end-user application with the security information injected by the security proxy; and providing a representation of data associated with the received service in the interface.

7. The article of manufacture of claim 6, wherein the content to provide instructions for receiving the input soliciting the operation of the end-user application comprises content to provide instructions for receiving input soliciting an operation of a desktop widget.

8. The article of manufacture of claim 7, wherein the content to provide instructions for receiving the input soliciting the operation of the desktop widget comprises content to provide instructions for receiving input soliciting an operation of an enterprise widget having self-contained access to an enterprise backend server.

9. In a service mediator that provides services to an end-user application, a method comprising:

receiving at the service mediator from an end-user application a request for a service of a backend server, wherein the end-user application is one of multiple enterprise widgets, limited featured applications that execute on a widget runtime environment on a computing platform of an enterprise, the enterprise widgets available to a user authenticated on the computing platform, the widget runtime environment to execute on the computing platform to provide an execution platform on the computing platform including services shared by the enterprise widgets including the service mediator, each enterprise widget including functionality to access enterprise data from one or more backend servers of the enterprise;

determining at the widget runtime environment via the service mediator that the request for the service requires security information;

determining at the widget runtime environment via the service mediator that the request from the end-user application is missing the required security information;

obtaining the required security information not included in the request from a security information source separate from the end-user application;

injecting the required security information into the request; and forwarding the request for the service to the backend server to cause the backend server to authenticate the end-user application with the security information injected by the service mediator.

10. The method of claim 9, wherein determining that the request for the service requires security information comprises:

sending the request to the backend server; and receiving a response at the widget runtime environment from the backend server requiring authentication information.

11. The method of claim 9, wherein determining that the request from the end-user application does not include the required security information comprises:

identifying the request as being from one of a particular type of applications.

12. The method of claim 9, wherein determining that the request from the end-user application does not include the required security information comprises:

identifying the request as being received on a particular interface.

13. The method of claim 9, wherein injecting the security information comprises:

providing single sign-on (SSO) authentication information.

14. The method of claim 13, wherein providing the SSO authentication information further comprises:

obtaining the SSO authentication information from an SSO manager executing on a common operating environment with the end-user application.

15. The method of claim 9, wherein injecting the security information comprises:

providing user name and password information with the request.

16. The method of claim 9, further comprising:
receiving a response from the backend server that includes data related to the requested service; and
forwarding the response to the end-user application.

17. An article of manufacture comprising a non-signal machine readable storage medium having content stored thereon to provide instructions that cause a machine to perform operations including:
receiving at the service mediator from an end-user application a request for a service of a backend server, wherein the end-user application is one of multiple enterprise widgets, limited featured applications that execute on a widget runtime environment on a computing platform of an enterprise, the enterprise widgets available to a user authenticated on the computing platform, the widget runtime environment to execute on the computing platform to provide an execution platform on the computing platform including services shared by the enterprise widgets including the service mediator, each enterprise widget including functionality to access enterprise data from one or more backend servers of the enterprise;
determining at the widget runtime environment via the service mediator that the request for the service requires security information;
determining at the widget runtime environment via the service mediator that the request from the end-user application is missing the required security information;
obtaining the required security information not included in the request from a security information source separate from the end-user application;
injecting the required security information into the request; and
forwarding the request for the service to the backend server to cause the backend server to authenticate the end-user application with the security information injected by the service mediator.

18. The article of manufacture of claim 17, wherein the content to provide instructions for determining that the request from the end-user application does not include the required security information comprises content to provide instructions for
identifying the request as being at least one of a request from one of a particular type of applications, or a request received on a particular interface.

19. The article of manufacture of claim 17, wherein the content to provide instructions for injecting the security information comprises content to provide instructions for providing single sign-on (SSO) authentication information.

20. A system comprising:
an end-user application operating out of memory, the end-user application to generate a request for a backend service, the request lacking security information required to access the backend service, wherein the end-user application is one of multiple enterprise widgets, limited featured applications that execute on a widget runtime environment on a computing platform of an enterprise, the enterprise widgets available to a user authenticated on the computing platform, the widget runtime environment to execute on the computing platform to provide an execution platform on the computing platform including services shared by the enterprise widgets, each enterprise widget including functionality to access enterprise data from one or more backend servers of the enterprise; and
a security proxy on the widget runtime environment coupled to the end-user application to obtain the request, determine that the request from the end-user application does not include required security information for the request, obtain the required security information not included in the request from a security information source separate from the end-user application, and inject the security information into the request in response to determining that the request does not include the required security information to authenticate the end-user application based on the security information injected by the security proxy to enable the end-user application to access the backend service.

21. The system of claim 20, wherein the end-user application comprises an enterprise widget having self-contained access to an enterprise backend server.

22. The system of claim 20, wherein the end-user application has no self-contained access to security information.

23. The system of claim 20, wherein the security proxy injects security information including single sign-on (SSO) authentication information obtained from an SSO manager executing on a common operating environment with the end-user application.

* * * * *